United States Patent Office 2,727,599
Patented Dec. 20, 1955

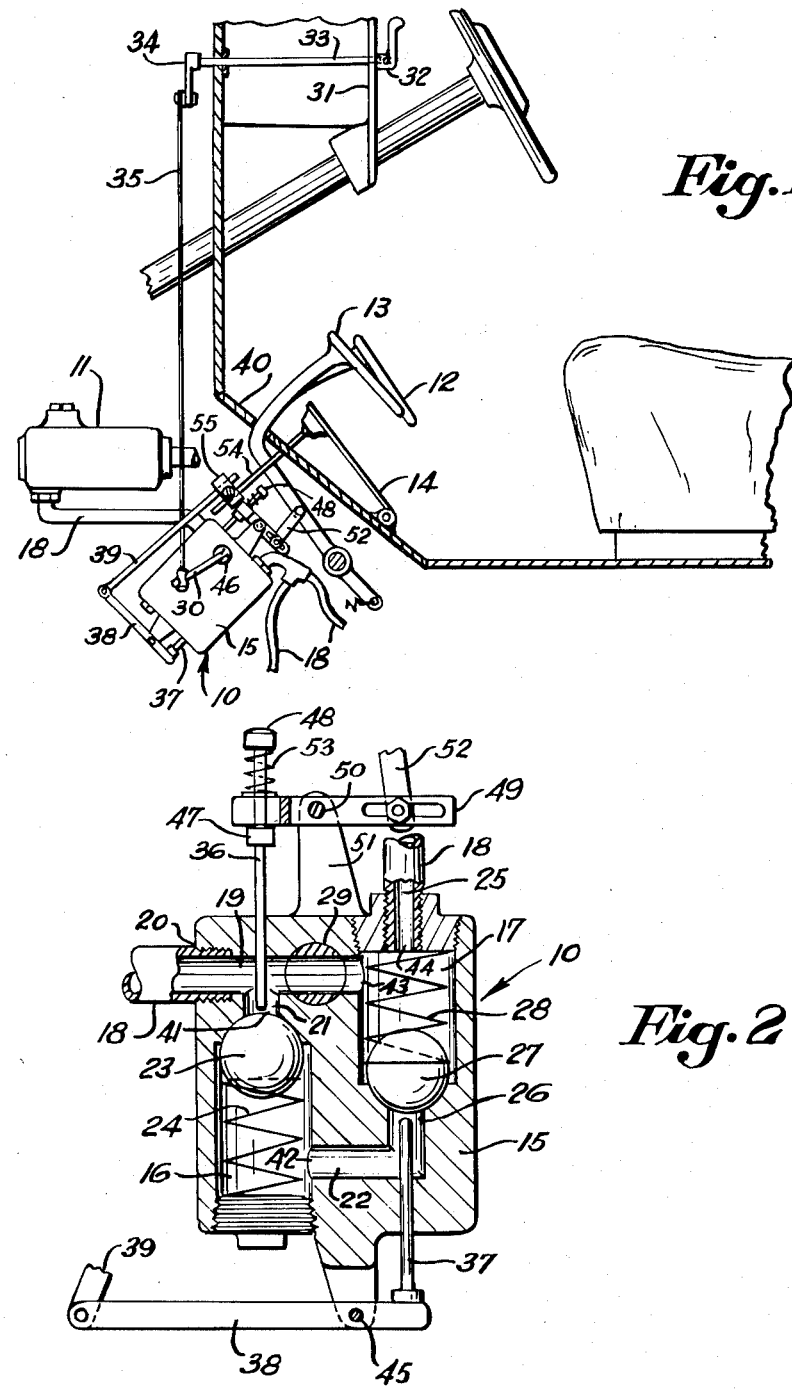

2,727,599
BRAKE HOLDING DEVICE FOR MOTOR VEHICLES

Veto Melfi, Jamaica, N. Y.

Application October 29, 1951, Serial No. 253,710

6 Claims. (Cl. 192—.048)

This invention relates to a brake holding device for motor vehicles equipped with a fluid pressure braking system.

Stopping and starting a motor vehicle on an up grade permits a momentary roll back in many instances and frequently will choke off the motor. Stopping a motor vehicle on a down grade and releasing the brakes frequently permits undesirable additional forward motion of the vehicle.

It is an object of the instant invention to provide a simple mechanical device which will hold the brakes of the vehicle in the applied position without roll back or creeping when the brake pedal is released.

A further object is to provide a brake holding device that can be readily installed in any motor vehicle equipped with a fluid operating braking system.

Another object is to add to the safety of the highways and the comfort of drivers.

Other objects of the instant invention will become apparent in the course of the following specification.

In the attainment of these objectives, the brake holding device is constituted of a control unit inserted in the brake line. In the control unit are two spaced reservoirs both of which are connected at the top in the brake line and connected together at the bottom. A ball valve under tension in the top opening of one reservoir leading to the master cylinder is maintained in the open position when the clutch pedal is released and closed when that pedal is depressed. A similar valve in the bottom connection of the second reservoir to the first reservoir is maintained in the closed position until the accelerator pedal is depressed. A shut-off valve in the brake line intermediate the tops of the reservoirs and operable from the instrument panel when open permits the brake fluid to function in the usual manner, but when closed and the brakes are applied will divert the fluid through the reservoirs where it remains locked to hold the brakes in the applied position with the brake pedal released until the accelerator pedal is depressed.

The invention will appear more clearly from the following detailed description when taken in conjunction with the accompanying drawing showing by way of example a preferred embodiment of the inventive concept.

In the drawing:

Figure 1 is a fragmentary side view of the driver's compartment of a motor vehicle equipped with the brake holding device constructed in accordance with the principles of this invention; and Figure 2 is a cross section through the brake control device shown in Figure 1 but on an enlarged scale.

Referring now in greater detail to the drawing where like reference numerals indicate like parts, reference numeral 10 indicates the brake control device, 11 the master cylinder of the fluid pressure braking system, 12 the brake pedal, 13 the clutch pedal, and 14 the accelerator pedal.

The brake control unit 10 is constituted of a body 15 formed from any suitable material and is dimensioned to be fitted in the usually limited space under the floor boards of the driver's compartment as illustrated.

The body 15 has formed therein a lower reservoir 16 and an upper reservoir 17. The lower reservoir 16 has an upper port 41 and a lower port 42. The upper reservoir 17 has two upper ports, an upper side port 43 and an upper end port 44 and one lower port 26. A passageway 19 is also formed in the body 15 and into one port 20 of which the end of the brake line 18 to the master cylinder is threaded. The opposite or inner end of the passageway 19 leads into the upper reservoir 17 through the upper side port 43 as illustrated. A short passageway 21 may connect the top of the lower reservoir with the passageway 19. Connecting the lower ports 42 and 26 of the reservoirs is a passageway 22.

The upper port 41 of the lower reservoir and the lower port 26 of the upper reservoir have the inner peripheries thereof formed into valve seats. Coacting with the valve seat around the port 41 is the ball valve 23 and coacting with the valve seat around the port 26 is the ball valve 27. The ball valve 23 when free is held under tension against the seat by the spring 24 inserted under tension in the reservoir as illustrated. In a like manner, the ball valve 27 when free is held under tension against the seat by the spring 28.

In the passageway 19 intermediate the points of connection with the reservoirs is the shut-off valve 29. An opening 46 aligned with the valve 29, is made in the body for the rotatable insertion of one end of an L-shaped arm 30, the inserted end of which is keyed to the valve for rotation thereby. The opposite end of the arm is turned and spaced from the body for operable engagement from the instrument panel 31 as follows: On the panel is a handle member 32 keyed to one end of a shaft 33 rotatably inserted through the panel and the front of the driver's compartment as illustrated. Keyed to the free end of the shaft 33 is another L-shaped arm 34, and pivotally connecting the free ends of the arms 30 and 34 is a link 35. The shut-off valve 29 is shown in the open position in Figure 2, but the arms 30 and 34 are so designed that a rotary motion or a slight reciprocal rotary motion of the handle member 32 will open and close the valve at the will of the driver.

Coacting with the ball valve 23 in the lower reservoir 16 is one end of a plunger 36 slidably inserted through the body 15 and upwardly directed therefrom. Adjacent the upwardly directed end of the plunger 36 is a land 47 and at the end extremity is a second land 48. Slidably inserted on the plunger intermediate the lands is the weight arm of a lever 49 fulcrumed at the point 50 on a support 51 integrally formed with or attached to the body 15 in any known manner. Pivotally attached to the power arm of the lever 49 is a link 52 adjustably attached to the lever of the clutch pedal under the floor boards as illustrated. Intermediate the land 48 and the weight arm of the lever 49 sliding between the lands 47 and 48 is a spring 53 designed to keep the weight arm in contact with the land 47 when the clutch lever is released. By the construction, when the clutch pedal is released, the plunger 36 is moved downwardly to unseat the ball 23, but when depressed will permit the ball 23 to seat and close the passageway 21.

In operable engagement with the ball valve 27 in the upper reservoir 17 is one end of another plunger 37 also slidably inserted through the body 15. Coacting with the downwardly directed free end of the plunger 37 is the weight arm of a lever 38 fulcrumed by any known means at the point 45 to any suitable protrusions on the bottom of the body. The power arm of the lever 38 is extended forwardly of the body, that is, toward the master cylinder 11 as illustrated, with the free end pivotally connected to one end of a link 39, the free end of the link 39 being upwardly directed and spaced parallel from the accelerator connecting rod 54 to which it is attached by any suitable clamp 55.

In operation:

Suppose the vehicle is being driven up an inclined highway intersecting a cross road protected with a signal light, that the vehicle reaches the cross road against the light and must be brought to a stop. The driver moves the handle member 32 on the panel 31 to a position closing the shut-off valve 29 and depresses the brake pedal 12 to apply the brakes. By depressing the brake pedal, the fluid is forced out of the master cylinder 11 into the brake line 18 leading to the control unit 10, thence into the passageway 19 where it is blocked by the closed shut-off valve 29. However, with the clutch pedal 13 released, the ball valve 23 will be unseated and the fluid will readily pass into and fill the lower reservoir 16, and thence pass through the passageway 22 to unseat the ball valve 27 and fill the upper reservoir 17. When the upper reservoir is filled, the excess fluid still under pressure will pass through the upper end port 44 into the brake line leading to the cylinders operating the wheel brakes. With the brakes applied, the driver depresses the clutch pedal 13. As soon as the clutch pedal is depressed, the link 52 moves downwardly to pivot the weight arm of the lever 49 upwardly. The upward movement of the weight arm moves the plunger 36 upwardly to permit the ball valve 23 to seat and doubly lock the fluid under pressure in the brake line from the control unit to the wheels to maintain the brakes applied as soon as the brake pedal is released. Of course, the next step is to shift to low gear for again starting when the signal light changes. With the engine still idling and the signal light changed, the driver has only to press down on the accelerator pedal to simultaneously unlock the brakes and race the motor while releasing the clutch pedal. With the vehicle under way, the shut-off valve 29 may then be opened and the brakes operated in the usual manner for reducing speed where no full stop is intended.

In the type of motor vehicles having no clutch, the device constituted of the upper chamber 17 only can still be used. Moreover, the complete device can be used as a holding unit in the same type of vehicles by suitably attaching the plunger 36 to the selecting rods of the automatic gears.

While there has been described but one embodiment of the brake holding device, it is still possible to produce other embodiments without departing from the inventive concept. Hence, it is desired therefore that only such limitations be imposed on the appended claims as are stated therein.

What is claimed is:

1. A brake holding device for a motor vehicle having a clutch pedal and a brake line, the brake holding device comprising a control unit disposed in the brake line, said unit having at least one reservoir and a passage way formed therein, the passage way having an inlet and an outlet, means for connecting the inlet and outlet in the brake line, the reservoir having a lower port and an upper port, means for connecting the upper port to the passage way; the control unit further having a second passage way formed therein, the second passage way connecting the lower port with the outlet and with the first-mentioned passage way at a point spaced from the connection of the upper port with the first-mentioned passage way on the side opposite the inlet, a shut-off valve disposed in the first-mentioned passage way intermediate the points of connection of the upper and the lower ports thereof, a ball valve coacting with the upper port disposed in the reservoir, spring means for maintaining said ball valve normally closed, and leverage means intermediate the clutch pedal and said ball valve for unseating said ball valve when the clutch pedal is released.

2. A brake holding device for a motor vehicle having clutch and accelerator pedals and a brake line, a brake holding device comprising a control unit for the brake line, said control unit having an inlet and an outlet and a lower and an upper reservoir, the lower reservoir having an upper and a lower port and the upper reservoir having two upper ports and a lower port; the control unit further having a passage way connecting the inlet to the brake line and the upper port of the lower reservoir and one of the upper ports of the upper reservoir and a second passage way connecting together the lower ports of both reservoirs, and means for connecting the free upper port of the upper reservoir to the outlet; the control units further comprising a shut-off valve disposed in the first-mentioned passage way intermediate the reservoirs, a ball valve disposed in the lower reservoir coacting with the upper port thereof, spring tension means for maintaining said ball valve normally closed, a second ball valve disposed in the upper reservoir and coacting with the lower port thereof, spring tension means for maintaining said second-mentioned ball valve normally closed, leverage means intermediate the clutch pedal and said first-mentioned ball valve for unseating said first-mentioned ball valve when the clutch pedal is released, and leverage means intermediate the accelerator pedal and the second-mentioned ball valve for unseating the second-mentioned ball valve when the accelerator pedal is depressed.

3. A brake holding device for a motor vehicle having an instrument panel, a clutch, accelerator pedals and a brake line, the brake holding device comprising a control unit disposed in the brake line adjacent the pedals, said unit having an inlet and an outlet and a lower and an upper reservoir formed therein, the lower reservoir having an upper and a lower port and the upper reservoir having an upper end port and an upper side port and a lower port formed therein; the unit further having formed therein a passage way connecting the inlet with the upper port of the lower reservoir and the upper side port of the upper reservoir and a second passage way connecting together the lower ports of each reservoir, means for connecting the upper end port of the upper reservoir to the outlet, a shut-off valve disposed in the first-mentioned passage way intermediate the connections of the reservoirs therewith; the control units further having formed in one side thereof an opening substantially aligned with the shut-off valve, leverage means intermediate the instrument panel and the opening for operating the shut-off valve, a ball valve disposed in the lower reservoir, spring tension means for maintaining said ball valve normally in the closed position of the upper port, a second ball valve disposed in the upper reservoir, spring tension means for maintaining said second-mentioned ball valve normally in the closed position of the lower port, leverage means intermediate the clutch pedal and the first-mentioned ball valve for unseating said ball valve in the released position of the clutch pedal, and second leverage means intermediate the accelerator pedal and the second-mentioned ball valve for unseating the second-mentioned ball-valve in the depressed position of the accelerator pedal.

4. A brake holding device for a motor vehicle according to claim 3 in which the leverage means intermediate the instrument panel and the opening for operating the shut-off valve comprises an L-shaped arm, one end of the arm being keyed to the valve and rotatable therewith, a shaft rotatably inserted through the instrument panel, a handle member keyed to the end of the shaft adjacent the panel, a second arm keyed to the free end of the shaft, and a link pivotally disposed intermediate the free ends of the first-mentioned and second-mentioned arms.

5. A brake holding device for a motor vehicle according to claim 3 in which the leverage means intermediate the clutch pedal and the first-mentioned ball valve for unseating said ball valve in the released position of the clutch pedal comprise a plunger slidably disposed in the unit, one end of the plunger being adapted to coact with the ball valve, and a leverage system intermediate the clutch pedal and the free end of said plunger for maintaining said ball valve unseated when the clutch pedal is released.

6. A brake holding device for a motor vehicle according to claim 3 in which the second mentioned leverage means intermediate the accelerator pedal and said second-mentioned ball valve for unseating said ball valve in the depressed position of the accelerator pedal comprises a second plunger slidably disposed in the unit, one end of said second plunger being adapted to coact with the second-mentioned ball valve and the free end of said second plunger protruding from the bottom of the unit, and second leverage means intermediate the protruding end of said second plunger and the accelerator pedal for unseating said second-mentioned ball valve when the accelerator pedal is depressed.

References Cited in the file of this patent
UNITED STATES PATENTS

| | | |
|---|---|---|
| 770,101 | Nilson | Sept. 13, 1904 |
| 1,965,459 | Fischer | July 3, 1934 |
| 2,181,699 | Leichsenring | Nov. 28, 1939 |
| 2,201,125 | Freeman | May 14, 1940 |
| 2,262,842 | Geopfrich | Nov. 18, 1941 |
| 2,345,280 | Morgan et al. | Mar. 28, 1944 |